March 14, 1950 — V. R. WILL — 2,500,650
SLEEPING ATTACHMENT FOR AUTOMOBILES
Filed March 19, 1946 — 3 Sheets-Sheet 1

INVENTOR
Victor R. Will

March 14, 1950 V. R. WILL 2,500,650
SLEEPING ATTACHMENT FOR AUTOMOBILES
Filed March 19, 1946 3 Sheets-Sheet 2

INVENTOR
Victor R. Will
BY
ATTORNEYS

March 14, 1950           V. R. WILL           2,500,650
SLEEPING ATTACHMENT FOR AUTOMOBILES
Filed March 19, 1946           3 Sheets—Sheet 3
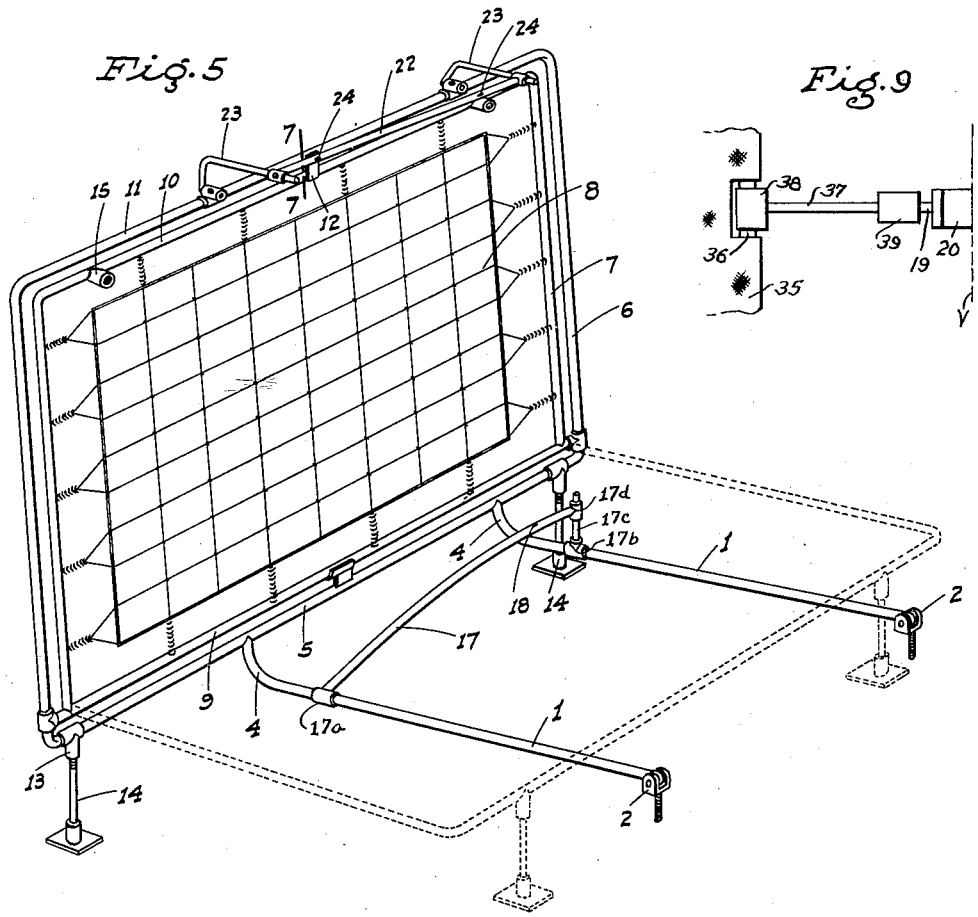
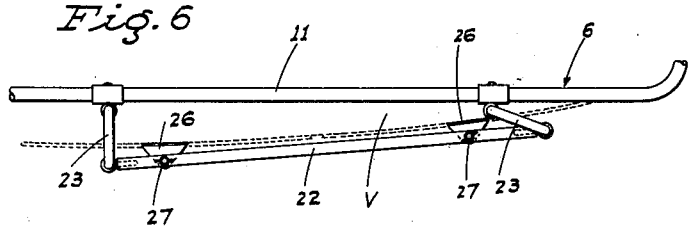
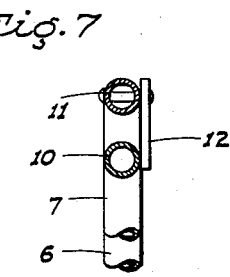
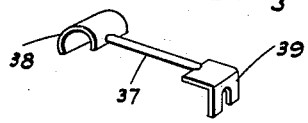
INVENTOR
Victor R. Will
BY
ATTORNEYS Patented Mar. 14, 1950

2,500,650

UNITED STATES PATENT OFFICE 2,500,650

SLEEPING ATTACHMENT FOR AUTOMOBILES

Victor R. Will, Sacramento, Calif.

Application March 19, 1946, Serial No. 655,616

3 Claims. (Cl. 135—1)

This invention relates to a folding sleeping attachment for a motor vehicle, and in general is a simplified modification of the structure shown in my U. S. Patent No. 1,966,023, dated July 10, 1934.

The principal object of the present invention is to provide a folding bed and tent attachment for an automobile designed to provide sleeping accommodations only, and so arranged that it may be unfolded and placed in an operative condition very quickly and easily, and as easily folded and raised to a transporting positon on the roof of the car.

A further object is to provide a structure of this character so constructed that no vital parts thereof need be removed, or their position altered when setting the bed up from a transporting position. Also, a tent covering is permanently mounted in connection with the structure, which is easily unfolded and drawn to the necessary taut condition after the bed is lowered.

Another object is to arrange the structure so that the bed when lowered is disposed in close relation to the side of the car on which the attachment is mounted, so that the extent of lateral projection of the unfolded structure is held to a compact minimum.

Still another object is to arrange the structure so that the bed is covered on both sides by the tent covering when said bed and covering are folded, so that the mattress and bedding may be left in place at all times if desired, without possible damage by inclement weather conditions.

A further object of the invention is to produce a simple and inexpensive device, and yet one which will be exceedingly effective for the purpose for which it is designed.

These objects are obtained by means of such structure and relative arrangement of parts as will fully appear by a perusal of the following specification and claims.

In the drawings:

Fig. 5 is a perspective view of the structure with the bed frame folded into the main frame, and with the tent covering removed.

Fig. 6 is a fragmentary top plan view of the frame structure showing the hold-down connection with the car on one side thereof.

Fig. 7 is a fragmentary enlarged cross section on line 7—7 of Fig. 5.

Fig. 8 is a perspective view of the tent tautening clip, detached.

Fig. 9 is a fragmentary plan view of a ridge pole and fastener therefor.

Figure 1:
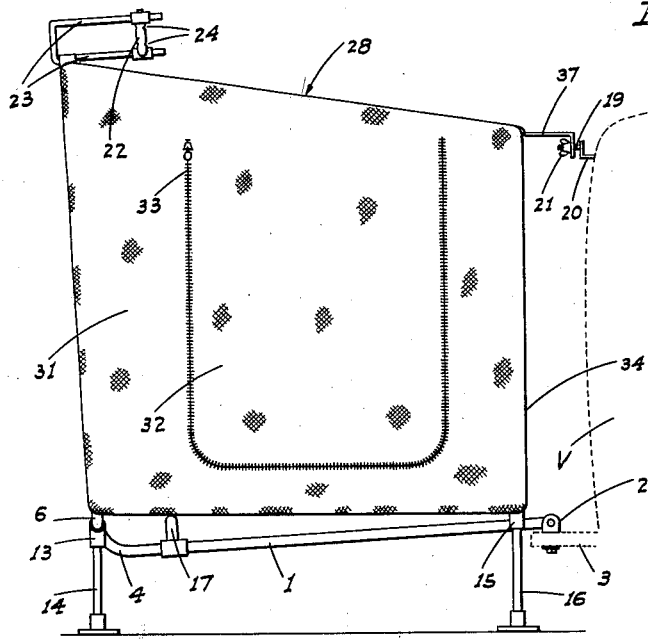
Fig. 1 is an end elevation of the attachment as unfolded and ready for use.

Referring now more particularly to the characters of reference on the drawings, the frame structure comprises a pair of rigid arms 1 provided at one end with swivel connection members 2 for mounting on one running board 3 of a vehicle V. At their opposite or outer ends, the arms are formed with a short upstanding bend 4 rigid with the lower longitudinal rail 5 of a rectangular main frame 6. This frame is of sufficient area to embrace a rectangular bed frame 7 having a bed spring 8 mounted therein. The arms 1 are considerably closer together than the ends of frame 6, said arms being secured to rail 5 intermediate its ends, as clearly shown in Fig. 5.

The bed frame 7 includes a longitudinal side rail 9 parallel to and adjacent the frame rail 5, and pivoted at its ends to the end members of frame 6. The opposite side rail 10 of the bed frame, when the latter is raised and folded into the main frame, is disposed adjacent and parallel to the top rail 11 of the main frame and is then releasably maintained against downward unfolding movement by a swivel holding finger 12 mounted on rail 11 and overlapping rail 10, as shown in Fig. 7.

The rail 5 is provided, adjacent its ends, with sockets 13 to receive removable ground engaging legs 14 disposed to depend from the frame when the latter is in an upstanding unfolded position.

Figure 2:
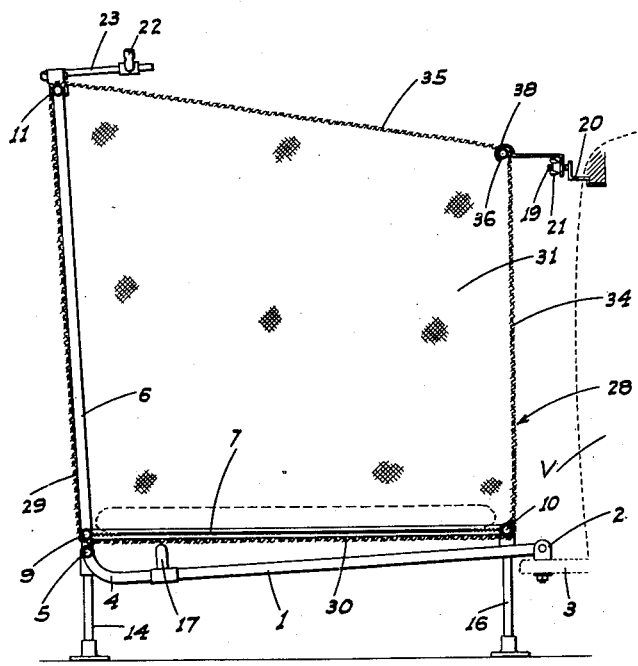
Fig. 2 is a transverse sectional elevation of the same.

The bed frame, when lowered or unfolded, extends over arms 1 in clearance relation, and rail 10 of said bed frame, which is then close to the corresponding side of the vehicle, is provided adjacent its ends with sockets 15 to receive removable ground engaging legs 16, as shown in Figs. 1 and 2. These legs, when engaging the ground together with legs 14, maintain the bed frame in a stable horizontal position.

Figure 3:
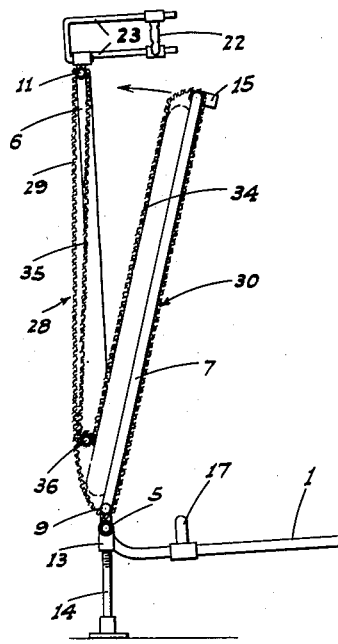
Fig. 3 is a transverse sectional elevation of the structure showing the initial folding movement of the parts.
Figure 4:
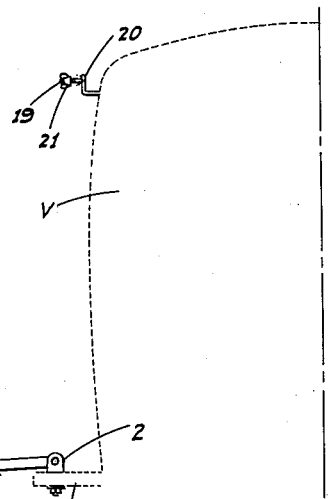
Fig. 4 is a similar view showing the structure as completely folded and on the roof of the car.
Figure 4:
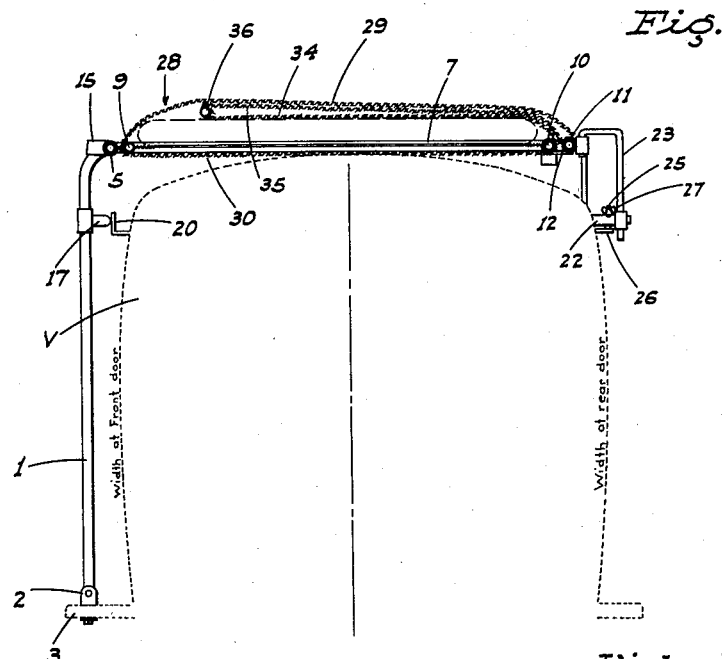

The length of arms 1 is such that when swung up to lie in a vertical position, frame 6 will then overhang and be disposed close against the roof of the car, as shown in Fig. 4. In order to then hold the arms against outward and downward swinging movement, said arms are connected near frame 6 by a cross bar 17 having an opening 18 in position to receive a stud 19. This stud projects laterally from a bracket 20 mounted on the car at the top of the front doorway on the corresponding side. The stud is provided with a removable wing nut 21 (see Fig. 3) so that after the stud is projected through opening 18, the bar 17 may be releasably clamped in place. The bar 17 is out of parallel to rail 5 so as to compensate for the lateral curvature or slope of the car body, said bar being adjustable in a manner to alter its non-parallelism to suit the curvature or slope of different car bodies. This adjustment is provided for, as shown in Fig. 5, by a collar 17a turnable on one of the arms 1 and a collar 17b turnable on the other arm 1. On the collar 17b is a pin 17c which is slidable through a collar 17d on the free end of the bar 17.

When the frame 6 is so disposed in overhanging relation relative to the top of the vehicle the rail 11 of the frame 6 will then be positioned on the side of the vehicle opposite to that on which the rail 5 is disposed. A longitudinal bar 22 is adjustably supported from hangers 23 mounted on rail 11 and projecting laterally out therefrom when frame 6 is on top of the car, as shown in Fig. 4, and in non-parallel relation to the adjacent rail 11, as shown in Fig. 6.

Barr 22 is provided with openings 24 to receive studs 25 projecting upwardly from brackets 26 mounted on the car at the top of the doorways thereof on the side adjacent which the rail 11 lies when the frame 6 overhangs the top of the vehicle. The studs are provided with removable wing nuts 27 adapted to be clamped down onto bar 22 when the studs are projected therethrough. It will thus be seen that the attachment is firmly held in place; the bar 22 being adjustably mounted for the particular car on which the attachment is mounted so that the end rails of frame 6 are then in firm contact with the roof of the car so that rattling is prevented.

In order to protect the occupants of the bed, as well as the bed itself, when in transportation, a tent or envelope 28 of suitable flexible material, such as waterproof canvas, is provided. This tent extends about the main frame 6 on the outside to there form an outer side wall, as as 29, and it also extends about the under side of the bed frame 7, as shown in Fig. 2. Further, the tent includes foldable end walls 31, one of which is provided with a door flap 32 closed by an endless fastener 33, an inner side wall 34 adjacent the vehicle and opposite frame 6 when set up, and a top or roof 35 extending from the top of frame 6 to the top of and connected to end walls 31 and side wall 34.

A ridge pole 36 is provided in the tent along the junction of roof 35 with side wall 34. When the tent is set up, the pole is engaged intermediate its ends by a tensioning arm 37 which includes a pole engaging hook 38 on one end and a fork 39 on the opposite end adapted to slip down over stud 19 behind the wing nut thereon. The tent is of course provided with an opening to expose a short portion of the ridge pole at the proper point for engagement with the hook.

When the attachment is to be folded after use, arm 37 is first removed. The roof 35 and sidewall 34 are then folded down so that roof 35 lies substantially parallel to and adjacent frame 6 while sidewall 34 covers the bed. The end walls 31 of the tent fold inwardly so as to be disposed between tent walls 34 and 35.

The bed frame is then folded up and held in the frame 6 by the finger 12, the legs 16 being then removed. The main and bed frames are then swung up and onto the roof of the car and are clamped in place, as previously described.

It will thus be seen that the roof of the car is protected by the adjacent tent wall 39 from being scratched by the metal frame, while the bed mattress and coverings are protected from above by the multiple layers of canvas, as shown in Fig. 4.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sleeping attachment for a motor vehicle comprising a pair of arms, means pivoting the arms at one end in spaced relation lengthwise of and on the vehicle on one side thereof for movement between a laterally outward position and an upstanding position adjacent said side of the vehicle, a rectangular main frame rigidly connected with the arms at their outer ends and arranged to extend substantially vertical when the arms are in said laterally outward position, a substantially rectangular flexible protective covering enveloping the frame and extending between said frame and the adjacent side of the vehicle, said covering having an outer side wall engaging about the frame on the outside thereof, a top, and an inner side wall, a ridge pole fixed at the junction of the top and inner side wall, and releasable means connecting said ridge pole and the adjacent side of the vehicle to hold the covering in an operative outstretched position.

2. A sleeping attachment for a motor vehicle comprising a pair of arms, means pivoting the arms at one end in spaced relation lengthwise of and on the vehicle on one side thereof for movement between a laterally outward position and an upstanding position adjacent said side of the vehicle, a rectangular main frame rigidly connected with the arms at their outer ends and arranged to extend substantially vertical when the arms are in said laterally outward position, a substantialy rectangular flexible protective covering enveloping the frame and extending between said frame and the adjacent side of the vehicle, said covering having an outer side wall engaging about the frame on the outside thereof, a top and an inner side wall, a ridge pole in the covering along the junction of the top and inner side wall thereof, said covering having an opening to expose a portion of the pole, a holding arm removably engaging over said exposed portion of the pole, and means to releasably connect the arm and the vehicle and place such arm under tension.

3. A sleeping attachment for a motor vehicle comprising a pair of arms, means pivoting the arms at one end in spaced relation lengthwise of and on the vehicle on one side thereof for movement between a laterally outward position and an upstanding position adjacent said side of the vehicle, a rectangular main frame rigidly connected with the arms at their outer ends and arranged to extend substantially vertical when the arms are in said laterally outward position, a bed frame pivoted in the main frame adjacent the arms for folding into the frame and unfolding movement to a horizontal position overlying the arms, a substantially rectangular foldable protective covering, such covering including an outer side wall engaging the main frame on the outside, a bottom wall extending under and engaging the bed frame, a top, and an inner side wall, the top and inner side wall of the covering being foldable between the bed frame and said outer side wall when the bed frame is folded upwardly into the main frame.

VICTOR R. WILL.

REFERENCES CITED

The following references are of record in the file of this patent:

UNITED STATES PATENTS

| Number | Name | Date |
|---|---|---|
| 1,559,211 | Wingate | Oct. 27, 1925 |
| 1,566,612 | Loustalot | Dec. 22, 1925 |
| 1,966,023 | Will | July 10, 1934 |